Nov. 29, 1938.  H. L. MOORE  2,138,743
VEHICLE RECORD AND ARTICLE HOLDER
Filed May 3, 1938
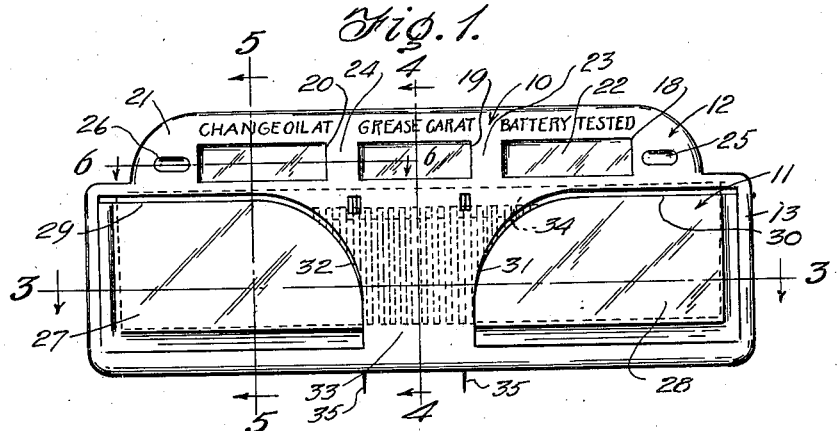
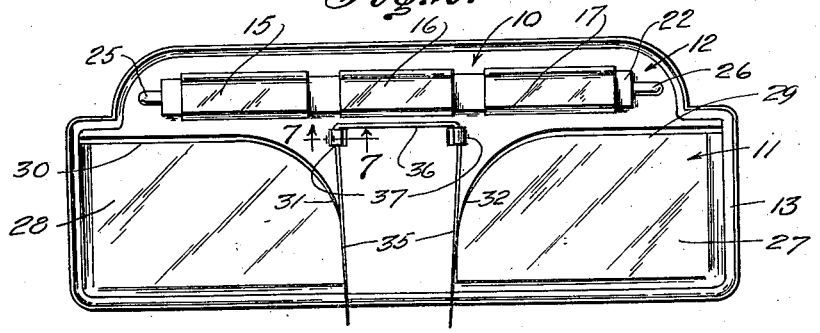
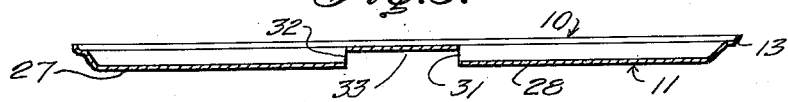
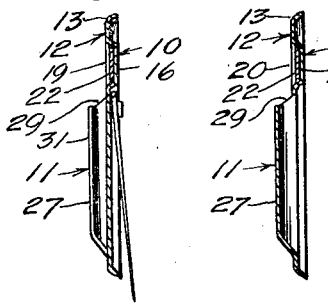
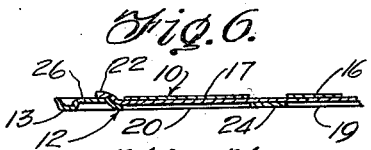
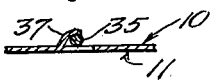
Inventor
HOWARD L. MOORE,
By Kimmel & Crowell,
Attorneys.

Patented Nov. 29, 1938

2,138,743

UNITED STATES PATENT OFFICE 2,138,743

VEHICLE RECORD AND ARTICLE HOLDER

Howard Leslie Moore, Cochranton, Pa.

Application May 3, 1938, Serial No. 205,773

3 Claims. (Cl. 40—17)

This invention relates to motor vehicle or car records and article holders and more particularly to a device adapted to be attached to the upholstery of the vehicle.

An object of this invention is to provide an improved holder or support which is provided with attaching means for readily attaching the device onto the upholstery of a door or other part of the vehicle which is provided with means whereby certain records relating to the vehicle may be readily kept and changed at will.

At the present time in the operation of the motor vehicle when the oil is changed in the engine, and when the car is greased the attendant usually attaches a card either underneath the hood of the vehicle or on some part of the dashboard so that the owner or operator of the vehicle will be able to determine when another or subsequent servicing of the vehicle is necessary. Such cards or records as are at present attached to the vehicle are frequently lost and it is therefore an object of this invention to provide a car record means whereby the operator or owner of the vehicle will at various times during the operation of the vehicle glance at the record of the previous servicing, thus bringing to the operator's attention the need for a subsequent servicing. This feature is accomplished by providing in combination with the record means an article holder which is frequently used by the operator of the vehicle, and in the present instance the article holder is constructed for the purpose of holding a comb.

Another object of this invention is to provide in combination with a device of this kind an improved holder which is adapted to receive an article such as a comb with an intermediate portion of the comb exposed so that the comb may be readily removed from the holder.

A further object of this invention is to provide a device of this kind which is adapted to be formed by way of die stamping and punching from a single sheet of metal so that the device can be readily and quickly constructed and produced at a relatively small cost.

A still further object of this invention is to provide a device of this kind which is attractive so that it will not detract from the appearance of the car when secured to the upholstery thereof on the inside of the vehicle.

To the foregoing objects and to others which may hereinafter appear, the invention consists of the novel construction, combination and arrangement of parts as will be more specifically referred to and illustrated in the accompanying drawing wherein is shown an embodiment of the invention, but it is to be understood that changes, variations and changes may be resorted to which fall within the scope of the invention as claimed.

In the drawing:

Figure 1 is a detail front elevation of a device constructed according to an embodiment of this invention, Figure 2 is a detail rear elevation of the device, Figure 3 is a sectional view taken on the line 3—3 of Figure 1, Figure 4 is a sectional view taken on the line 4—4 of Figure 1, Figure 5 is a sectional view taken on the line 5—5 of Figure 1.

Figure 6 is a fragmentary sectional view taken on the line 6—6 of Figure 1, and

Figure 7 is a fragmentary sectional view taken on the line 7—7 of Figure 2.

Referring to the drawing, the numeral 10 designates generally a body plate in the form of a sheet metal member which is provided with a bead or rib 13 about the marginal edges thereof. The plate 10 is divided into a lower article holder portion 11 and an upper record holding portion 12. The record portion 12 at the opposite ends thereof is curved as at 14 and the record portion 12 is preferably of a length slightly less than the holder portion 11.

The record portion 12 comprises a plurality of aligned longitudinally spaced apart channel members 15, 16 and 17. These channel members 15, 16 and 17 open forwardly through windows 18, 19 and 20 which are formed in the face portion 21 of the record member 12. The channel members 15, 16 and 17 are open at each end thereof and an elongated record strip 22 is adapted to extend through the channel members being held therein by the connecting portions 23 and 24 between the several windows. The record strip 22 is exposed through the windows and at each end thereof projects beyond the outer ends of the outermost channel members and is held against movement by means of a pair of detents 25 and 26 which are struck from the plate portion 21 rearwardly so that the ends of the record strip 22 will be bent rearwardly as shown in Figure 6. In this manner the record strip 22 will be held against longitudinal movement by reason of the inherent resiliency of the strip, and the bending thereof by the detents 25 and 26.

The holder member 11 is constructed in substantially rectangular form being positioned below the record holder 12 and comprises a pair of longitudinally spaced apart pocket members 27 and 28. These pocket members 27 and 28 are formed by pressing the metal of the holder member 11 outwardly and cutting the metal along an upper edge thereof as at 29 and 30 so as to provide a free open upper edge for each pocket member. Each pocket member is also provided with free inner or confronting edges 31 and 32 and these inner edges 31 and 32 are spaced apart a distance sufficiently to provide a relatively wide finger engaging space 33. The pocket members 27 and 28 are adapted to receive therein a comb or similar elongated article 34 which has a length substantially equal to the distance between the outer ends of the two pocket members 27 and 28. When the article such as a comb 34 is positioned in the pocket members 27 and 28 the central or intermediate portion of the comb 34 will be exposed in the space 33 and the comb while having a height substantially equal to the depth of the pocket members may be readily removed from the pocket members by pushing the intermediate portion thereof upwardly by engaging a finger in the space 33.

The hereinbefore described holder is adapted to be detachably secured to the upholstery and to accomplish this purpose the plate member 10 has secured thereto a pair of elongated pin members 35 which are connected together by means of a connecting bar 36. The pin members 35 are attached to the plate 10 by striking a pair of tongues 37 rearwardly from the plate 10 and then bending these tongues 37 about the upper portion of each pin member 35 at a point adjacent the connecting member or bight 36. The lower or free ends of the pin members 35 are adapted to project down below the lower edge of the plate member 10 as shown in Figure 2 so as to facilitate the attachment of the device on the vehicle and initially these pin members 35 resiliently contact with the rear lower edge of the bead or reinforcing member 13. In this manner the resiliency of the pin members 35 will firmly hold the device in applied position on the vehicle upholstery.

In the use of this device the attendant at the service station after servicing the vehicle, such as changing oil, testing the battery or greasing the car, will indicate on that portion of the record strip 22 exposed through the windows 18, 19 and 20 the mileage of the vehicle as determined from the vehicle's speedometer. The windows 18, 19 and 20 are preferably differentiated by means of legends disposed thereabove and in the present instance these windows have legends such as "Battery tested", "Grease car at", "Change oil at" above the specific windows. It will, of course, be understood that any other suitable legends may be positioned in the desired space relative to the several windows so that the operator of the vehicle will know when a succeeding servicing of the vehicle for the particular operation should be performed.

The record strip 22 is preferably constructed of Celluloid which is provided with a roughened or frosted surface so that numerals or other indications may be written thereupon and may be erased or otherwise removed at a succeeding servicing of the vehicle. The device is applied to the upholstery by engaging the pins 35 with the cloth and then forcing the plate member 10 downwardly. Preferably the device hereinbefore described is furnished by the service station and is furnished with a comb 34 or other like article positioned in the pocket members 27 and 28. During the operation of the vehicle the operator will find ready use for the comb 34 and every time it is removed or replaced, the records carried by the record strip 22 will be brought to the attention of the operator so that this device will provide a means for frequently inviting the attention of the vehicle operator to the records carried thereby.

What I claim is:

1. A car record and article holder comprising a body plate, said plate having a plurality of horizontally aligned windows adjacent a longitudinal edge thereof, a plurality of aligned spaced apart channel members struck from said plate, said channel members facing said windows and having open opposite end portions, a record strip engaging in said channel members and projecting at opposite ends thereof beyond the outer ends of the outermost of said channel members, a pair of rearwardly offset detents struck from said plate adjacent the outer ends of the outermost of said channel members and engageable with the projecting ends of said record strip to hold said strip against longitudinal movement, a pair of spaced apart pocket members offset forwardly of said plate, said pocket members having free upper edges and free confronting edges whereby to removably receive an article having a length equal to the distance between the outer ends of said pocket members, and means carried by the back of said plate for engagement with the upholstery of a car to detachably secure the plate on the upholstery.

2. A car record and article holder comprising a body plate, said plate having a plurality of horizontally aligned windows adjacent a longitudinal edge thereof, a plurality of aligned spaced apart channel members struck rearwardly from said plate, said channel members facing said windows and having open opposite end portions, a relatively stiff record strip engaging in said channel members, detents struck rearwardly from said plate and engageable with the ends of said strip to normally hold said strip against longitudinal movement, and a pocket struck forwardly from said plate and disposed below said windows, said pocket being open at the upper edge thereof.

3. A car record and article holder comprising a body plate, said plate having a plurality of horizontally aligned windows adjacent a longitudinal edge thereof, a plurality of aligned spaced apart channel members struck rearwardly from said plate, said channel members facing said windows and having open opposite end portions, a relatively stiff record strip engaging in said channel members, and detents struck rearwardly from said plate and engageable with the ends of said strip to normally hold said strip against longitudinal movement.

HOWARD LESLIE MOORE.